United States Patent [19]

Rittenbach et al.

[11] 4,401,980

[45] Aug. 30, 1983

[54] CONSTANT CURRENT ELECTRONIC INTRUDER DETECTION SYSTEM

[75] Inventors: Otto E. Rittenbach, Monmouth County, N.J.; Reinhard G. Olesch, Kronberg, Fed. Rep. of Germany

[73] Assignee: The United States of America as represented by the Secretary of the Army, Washington, D.C.

[21] Appl. No.: 297,806

[22] Filed: Aug. 31, 1981

Related U.S. Application Data

[60] Division of Ser. No. 973,402, Dec. 26, 1978, which is a continuation-in-part of Ser. No. 840,206, Oct. 7, 1978.

[51] Int. Cl.³ .............................................. G08B 13/10
[52] U.S. Cl. .................................. 340/666; 340/524; 340/541
[58] Field of Search ............ 340/565, 566, 666, 692, 340/651, 541, 537; 367/135, 136, 169; 324/65 R, 65 CP, 354, 363

[56] References Cited

U.S. PATENT DOCUMENTS

| 949,451 | 2/1910 | Seragnoli | 340/541 |
|---|---|---|---|
| 3,836,899 | 9/1974 | Duvall et al. | 340/566 |
| 3,991,413 | 11/1976 | Berger | 340/537 |
| 4,040,044 | 8/1977 | Laymon et al. | 340/692 X |
| 4,047,166 | 9/1977 | Miller et al. | 340/566 X |
| 4,075,616 | 2/1978 | Rait | 340/666 |
| 4,155,083 | 5/1979 | Slaats et al. | 340/541 X |
| 4,359,721 | 11/1982 | Galvin et al. | 340/537 X |

FOREIGN PATENT DOCUMENTS

1429781 3/1976 United Kingdom ............... 340/541

Primary Examiner—Glen R. Swann, III
Attorney, Agent, or Firm—Robert P. Gibson; Jeremiah G. Murray; Michael C. Sachs

[57] ABSTRACT

An electronic detection system for detecting intruders employs a transmission line as a sensing element. In one embodiment the transmission line is a modified surface-wave transmission line, for example, a Goubau line which is positioned about the perimeter of the area to be protected. An intruder in the field of the line causes an RF reflection back toward the source, which reflection may be detected by Doppler range-gating techniques. In other embodiments of the invention, the transmission line is an insulated, twisted wire pair or a deformable transmission line. In some instances, the transmission line may be replaced with an active or passive pressure line.

1 Claim, 27 Drawing Figures

DISTANCE INDICATOR

FIG. 3 SWL WALKING MAN RESPONSE-PARALLEL WALK

FIG. 4 SWL CRAWLING MAN RESPONSE-NORMAL APPROACH

FIG. 6 a. DRIZZLE-CONTINUOUS RECORDING

FIG. 6 b. MODERATE RAIN-MAN WALKING 7 FT FROM SWL

FIG. 7 a. WALKING MAN AT 10 AND 5 FT -DRY WEATHER

FIG. 7 b. WALKING MAN AT 6 FT-RAIN

CONSTANT CURRENT ELECTRONIC INTRUDER DETECTION SYSTEM

GOVERNMENT LICENSE

The invention described herein may be manufactured and used by or for the Government for governmental purposes without the payment of any royalty thereon or therefor.

RELATIONSHIP TO PRIOR APPLICATIONS

This application is a divisional of copending application Ser. No. 973,402, filed Dec. 26, 1978, entitled "Improved Electronic Intruder Detection System" which itself is a continuation-in-part of application Ser. No. 840,206 filed Oct. 7, 1978 entitled "Electronic Intruder Detection System."

BACKGROUND OF THE INVENTION (a) Field of the Invention

Broadly speaking, this invention relates to electronic intruder-detection systems. More particularly, in a preferred embodiment, this invention relates to an electronic intruder-detection system which employs a transmission line as the sensing element.

(b) Discussion of the Prior Art

Most present-day intrusion-detection systems, including those that use line sensors, such as the balanced pressure system, should be classified as "point" sensor systems, i.e., systems which use independently powered and operating detectors having a limited range (in the order of several hundred feet) and zero range resolution. Typically, when surveillance over an extended boundary is required, many such sensors are employed side by side, each covering its respective segment and reporting alarm information to a central location. By the association of an alarm with the corresponding sensor the intruder is located, resolution being given by the spacing of the individual sensors.

For more efficient protection of a fixed installation perimeter, or surveillance over any other similarly defined arrow or irregular boundary, a "line" sensor is required, i.e., a sensor whose field of sensitivity is confined to a long, narrow corridor and which provides adequate range resolution. Such a system would comprise a suitable medium which guides energy with sufficiently low loss to cover as much as a mile of range, but whose field is also sufficiently "open" so that an intruder will cause a disturbance. Target location would then be accomplished by means of range gating, as commonly used in radar. This system would thus provide resolution in range (along the boundary) to avoid the need for separate electronics modules at every resolution element of coverage.

An intrusion detection system as above-described would have to satisfy the following criteria. First, the target requirements include the detection of not only walking and running intruders but also the stealthy, highly informed intruder who may approach the protected area crawling as slowly as 0.1 feet per second. Second, the intruder should trigger an automatic alarm to fix his location with a resolution suitable to the reaction which the operating procedures require. The desired resolution might, thus, vary from perhaps 100 feet to 1000 feet. Because intrusions will occur infrequently in such a surveillance system, but since an intrusion may prove very costly if successful, the detection probability for this type of target should be virtually 100%, while the false-alarm rate should be very low. For an electromagnetic system, this will require exceptional moving clutter rejection. For an actual installation, this requirement may demand a certain amount of foliage control. Finally, the system should be of relatively low cost per unit distance (compared to present sensors) and feature ease of installation and maintenance, as well as simplicity of operation.

The very nature of the problem also imposes certain limitations on the system. For example, animal activity is a potential source of false-alarms. A small animal which moves very close to a sensor can easily produce the same magnitude of disturbance as a man at a greater distance. Furthermore, the small cross-section of a prone intruder and his extremely low speed present limitations to a system which must reject moving foliage clutter. Finally, operation under certain weather conditions, particularly rain, snow and wind may also present limiting factors.

SUMMARY OF THE INVENTION

As disclosed herebelow, the instant invention is based on the discovery that a transmission line is generally the most suitable device for use as a line sensor in an electronic intrusion detection system. The first transmission line to be discussed is the surface-wave transmission line, which has the greatest, all-round applicability. Next, other forms of transmission lines will be discussed, in addition to the use of active and passive pressure lines.

A surface-wave transmission line, as its name suggests, is a transmission line which propagates electromagnetic energy along its surface. The inherently low-loss transmission characteristics of the surface wave line; its external, therefore, easily accessible, yet confined EM field; and its non-radiating characteristics make the SWL eminently suitable for a line sensor which must generate an EM field confined to a long, narrow and arbitrary corridor.

More specifically, in a preferred embodiment, the invention comprises a range-gated line sensor including a transmission line, means for launching coded radio frequency energy onto one end of the line, the intrusion of a target into a defined region of space about the line causing a return echo, and means for detecting the return echo thereby to detect the presence of the intruding target.

The invention and its mode of operation will be more fully understood from the following detailed description when taken with the accompanying drawings in which:

DETAILED DESCRIPTION OF THE INVENTION

As in the case of the previously-described line sensors, the detection of an intruder in the instant invention is accomplished through examination of the signal which the intruder reflects when he enters the electromagnetic field of the transmission medium. The disturbance is located by range-gating the return signals from the transmitted energy pulses.

The first transmission line we shall discuss, the so-called surface-wave Line (SWL), sometimes referred to as Goubau Line or G-Line, comprises a single conductor covered by a suitable dielectric coating. Electromagnetic energy propagates along this transmission line in the form of a surface wave. This well-known phenomenon, which has been thoroughly treated in the literature, has many features which make it useful for line sensor application.

By slightly reducing the phase velocity, i.e., to a few percent below the speed of light, the dielectric coating of the conductor changes what would otherwise be a plane wave propagating in the direction of the transmission line axis, into a surface wave of only limited radial extent. This is due to a small axial E component ($E_z$) which gives the E field of the traveling wave a slight forward tilt. In effect, it "binds" the energy to the transmission line, concentrating the field around the conductor. It may be shown that the radial field (r direction) may be expressed in terms of the Hankel function of order 1, as follows:

$$H_\theta, E_r \propto H_1(r)e^{j \cdot (wt - az)}.$$

Of practical interest are the approximations for $H_1(r)$. Specifically, for small r (near the surface), the field decays as $1/r$ while for large r ($>1.2$ wavelengths), the field exhibits stronger than exponential decay, namely $e^{-r}/\sqrt{r}$. The above expression also shows that the longitudinal field decay is exponential, having an attenuation constant $a$ as commonly associated with transmission lines. The SWL can, thus, be considered as an open waveguide having a confined radial field and only propagating energy longitudinally.

Some of the practical implications of the SWL characteristics should be emphasized. For example, the loss per unit distance is constant and relatively low for the line itself, and comprises primarily conductor and dielectric losses. Attenuation values of 6 db/mile have been achieved for practical lines. The attenuation increases with frequency, as would be expected, but of prime concern for intrusion detection are the losses caused by that portion of the field which extends into and propagates within the ground. For line sensor application, since a prone intruder must also be detected, the SWL is advantageously suspended only a few feet above ground and the field extent is designed to continue significantly into the ground. Ground losses constitute, therefore, the major portion of the total attenuation.

The extent of the field is affected by several parameters. By increasing either the $d_o/d_i$ ratio (outer diameter to diameter of conductor alone), the dielectric constant of the material, or the frequency, the radial field extent is decreased. Given a frequency and line height above ground, a $d_o/d_i$ ratio can be chosen that will provide the desired field strength on the ground to assure detection of a crawling man.

Besides the proximity of the ground, other deviations from the ideal SWL also result in losses. For example, radiation losses can occur due to perturbations in the geometry of the SWL. Such effects include radiation from bends or corners of the line, surface irregularities caused by rain drops, icicles or birds, and the effects of supporting devices. Since the individual discontinuities are measured in terms of wave lengths, radiation losses will be greater at higher frequencies.

Figure 1:
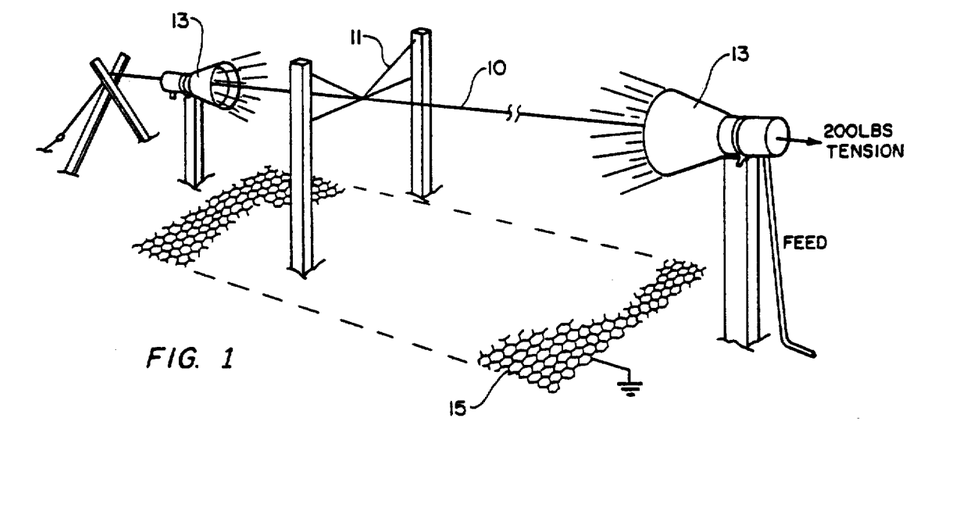
FIG. 1 is an isometric view of an illustrative surface wave transmission line intrusion detection system according to the invention.

The SWL used for the majority of the tests to be described below was a stranded 10 AWG conductor of copperclad steel with a coating of black polyethylene for an outside diameter of about 4 mm. As shown in FIG. 1, conductor 10 was suspended approximately 5 feet above the ground and supported at 50 feet intervals by thin nylon lines 11 strung between upright 8 foot posts. These supports, together with the application of 200 pounds tension, removed virtually all sag from the 400 feet line.

The surface wave was launched as well as terminated by means of horns 13 having dimensions suitable for the particular frequency and SWL geometry employed.

Since line 10 was originally constructed for a different purpose, it was suspected from the beginning that it would be far from optimum in one important respect; i.e., operation in rain, or in general, under conditions of time-varying physical surface perturbations which include the effects of snow, icicles and birds. A second simplified line of larger diameter was therefore constructed to test the effect of rain. This second line comprised 10 feet sections of 6" diameter galvanized sheet steel, suspended on a steel cable for a total length of 250 feet. To launch the wave, a vertical dipole was used with good results. This was found to give a sufficiently low VSWR to avoid saturating the receiver and resulted in sufficient energy on the line to detect targets.

Since the second experimental line had greater weight as well as wind resistance, movement was more severe, especially since it occurred with frequencies more nearly in the passband of the doppler filter. The line was, therefore, secured by guys spaced at 10 feet intervals. However, its natural catenary was retained, which produced a height above ground of 8 feet at the ends and 3 feet at the center. The tests described below were generally performed with the thin SWL, except when noted otherwise.

Figure 2:
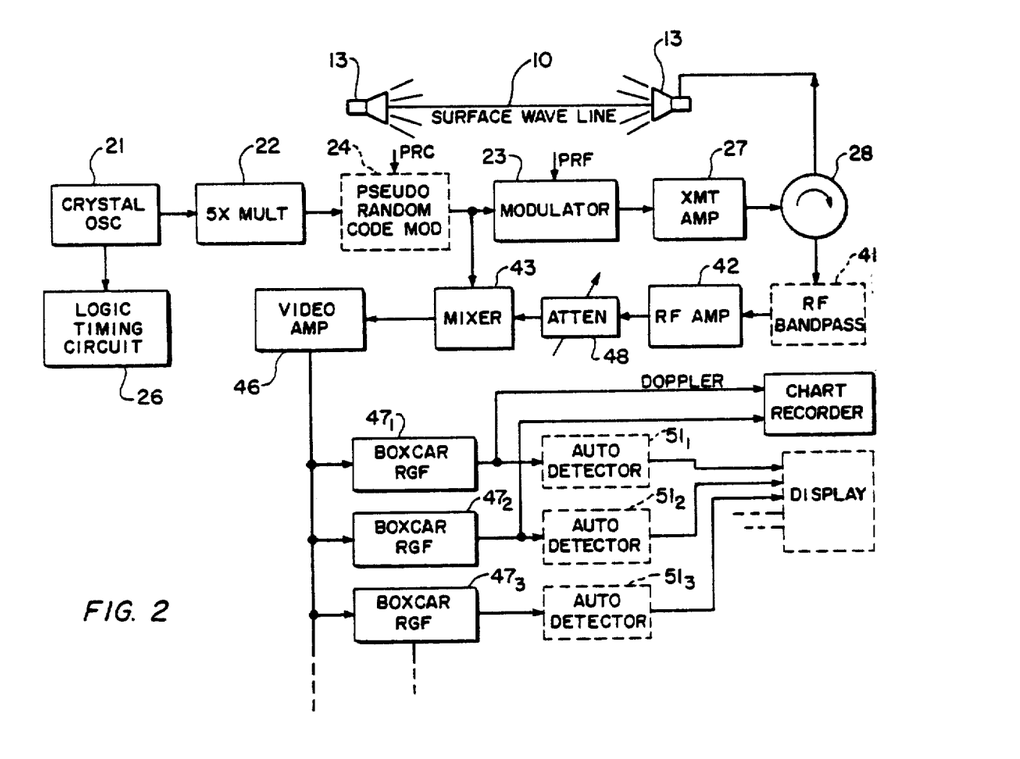
FIG. 2 is a block schematic drawing of an illustrative RF transmitter and Doppler receiver for use with the system shown in FIG. 1.

FIG. 2 shows a block diagram of the equipment employed in a first illustrative embodiment. The circuit is basically a pulse doppler radar with the SWL used in place of the antenna. The SWL is fed by a train of short RF pulses which propagate to the other end of the line being partially reflected along the way from discontinuities, both of the line as well as its surroundings. Return signals entering the receiver are demodulated and Doppler processed in a series of range-gated filters.

The block diagram shows a crystal oscillator 21 generating a 30 MHz signal from which all other signals (logic and RF) are derived. This signal is multiplied up by a factor of 5 in a multiplier 22 and prior to pulse modulation in modulator 23 is modulated by a phase switch 24 which is controlled by a Pseudo Random Code Generator. The latter switches the starting phase by 0° or 180° from pulse to pulse and has the effect of spreading the spectral energy between PRF lines instead of concentrating it solely at these lines, as is the case for an ordinary pulse radar. Since upon demodulation the received signal it treated similarly, the pseudo-noise modulation does not affect the desired signal. However, an interfering signal is strongly decorrelated by this process.

The modulator 23 is pulsed at a rate of 23 KHz, the pulses being variable between 50 and 300 ns. The output of modulator 23 is amplified in an amplifier 27 then fed to the SWL via a circulator 28. The peak power level of the signal entering line 10 is about 1.25 mw.

The receiver comprises a filter 41, an RF amplifier 42 and a coherent phase detector 43 which homodyne converts the received signal to baseband. The result is amplified in a video amplifier 46 and applied to a bank of range-gated filters (RGF) $47_1$-$47_n$ of which three are shown.

In the illustrative embodiment, the range gates are approximately 100 feet wide and spaced at intervals of 270 ns. The delay of the timing pulse train is variable, so that the range gates can be positioned as desired. Two of the range gates are located within the extent of the transmission line.

The bandpass filter 41 is positioned upstream of the receiver to eliminate any interfering signals which may be present in the received signal. Two bandwidth selections can be made to coarsely match the chosen pulse width.

An attenuator 48 is shown in the receiver and in the illustrative embodiment and is used primarily for measuring relative signal levels. Its setting is chosen to prevent limiting in the output.

Each range gate filter responds to Doppler signals over a range of 0.02-8 Hz which, at 150 MHz, corresponds to target velocities of about 0.06-25 feet/sec. While it is the Doppler signal which is recorded for measurement and which is discussed primarily, the actual RGF circuit further includes a plurality of Doppler detectors, integrators and thresholds $51_1$-$51_n$ which, when exceeded, may be used to sound an automatic alarm in the form of a light on a display panel as well as an aural tone.

Certain experimental tests were conducted using the arrangement shown in FIGS. 1 and 2. These tests comprised measuring all the significant signal levels at the output (Doppler), i.e., those signals which an automatic system would be required to process. An automatic alarm is considered an essential feature of a boundary surveillance system because extended ranges must be covered (many resolution elements), and because the rate of valid targets is extremely small, perhaps as low as one per month.

Assuming a fixed alarm threshold as employed in this radar, the most important single parameter of such a system is, therefore, the margin in db separating the minimum target signal and the maximum background signal. It can be shown that for a system with a 10 Hz bandwidth, a false alarm rate of 1 alarm per month may be expected if an approximately 12.5 db margin between the threshold and rms noise levels is maintained. This figure will be used as guide in the following discussion.

The worst-case intruder target for a radar system as described in this application would be one where an intruder is attempting to cross the surveillance line at right angles. This would minimize the time spent in the sensitive zone and result in minimum Doppler. Therefore, it is necessary to know the magnitude of the signals produced by the intruder at any distance normal to the line.

Figure 3:
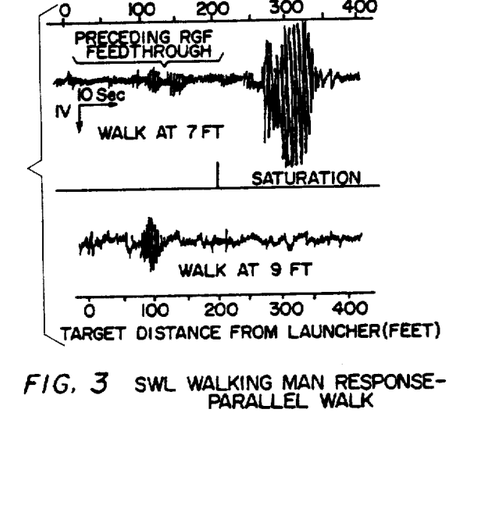
FIG. 3 is a graph showing the response of the system to a walking intruder.

Since for a walking man it is difficult to correlate the man's distance from the line and his signal at any one instant, a series of parallel walks was made, each at a fixed distance from the line and within the range gate. FIG. 3 shows the signals obtained from a walking man at distances of 7 and 9 feet from the SWL. Several points are noteworthy. First, the signal-to-background ratio is quite good, about 8 db for the 9 feet walk and at least 19 db for the 7 feet walk (some RGF saturation visible); secondly, the field surrounding the line, as judged by these two measurements, falls off very quickly with distance from the line, i.e., 11 db over a 2 feet change in distance. Furthermore, the action of the range gate is clearly visible. The range of the target from the feedhorn is given on the margin of the drawing. The target's speed was approximately 5 feet/sec.

Figure 4:
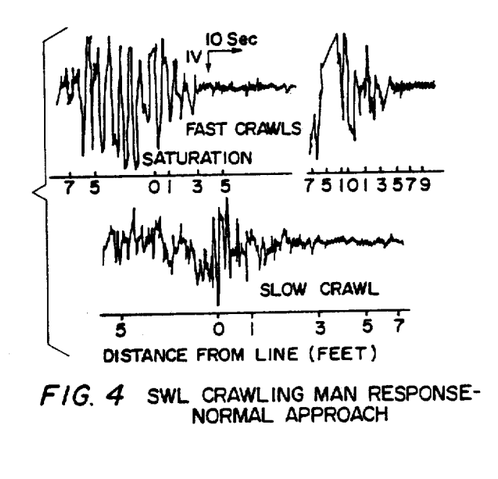
FIG. 4 is a graph showing the response of the system to a crawling intruder.

Crawling approaches were not made parallel, but rather normal to the line, in order to minimize the total distance covered in this manner, because at these slow speeds target position and signal output are easily correlated. FIG. 4 shows the results obtained from a crawling intruder crossing the SWL sensor at different speeds. The slowest crawl (0.12 feet/sec) resulted in a slightly smaller signal since many frequency components probably fell outside the passband of the RGF. The fast crawls were made at approximately 0.5 feet/sec. The signal-to-nonsignal ratios for these recordings are conservatively measured to be 19 and 21 db, which is an excellent margin and should provide virtually 100% detection. It should be noted that both traces contain frequency components higher than the basic Doppler, i.e., the target's speed. These are usually due to motion of the subject's limbs but in this case, the relative magnitude of the components is greater than usually observed with Doppler radar.

Analysis of the target and SWL geometry lead to the conclusion that the output produced by a normal approach is primarily due to a change in target cross-section, i.e., the amplitude modulation which the high field gradient imposes on the target as it changes its distance from the line. This was verified with an inanimate target, which was drawn across the line that produced a large signal. True Doppler shift cannot be produced by a strictly normal approach since no wave propagates radially from the line (neglecting the slight forward tilt due to $E_z$).

It is apparent from these experiments that there are three types of motion which can produce an output especially in the case of the crawling man: (1) true Doppler which results if the target changes range, i.e., moves axially (along the line); (2) motion on the ground toward the line which changes the target's proximity, hence results in an amplitude modulation due to the varying field; and (3) motion of the target's body or limbs (up or down), especially when the target is located directly beneath the line.

This, then, constitutes a definite advantage over a conventional radar approach since now the output-producing target speed is not only the range directed component of its velocity but also ensures that virtually any motion of the intruder will result in an output signal.

A further inherent advantage of the instant system is that a prone target does not result in a much smaller cross-section than an upright man. This is about as expected since, if the effect of the ground is neglected, the field about the line is a function of r only.

Certain other valid targets should be mentioned for completeness. These include vehicles, a running man or two-wheeled vehicles such as motorcycles or bicycles. The above-described test results indicate that such targets could not successfully cross the protected perimeter undetected. It was found that due to the sharp fall-off of the EM field in the radial direction, any clutter which was outside the narrow corridor of about ±10 feet about the line had practically no effect. To calculate the reflected energy from ground clutter which the SWL receives would require integration of the product of field strength and reflectance of the surroundings. Instead, it is easier and nearly as informative to simply compare clutter areas covered by the SWL and a typical radar point sensor. Assuming that a spacing between sensors (resolution) of 300 feet is desired, a pulse radar sensor would have one range gate, covering the ring about it from 150 feet to 300 feet, or about 212,000 feet$^2$ of area. (A narrower gate would require more bandwidth and a wider one would not be consistent with the 300 feet spacing of adjacent sensors (system resolution). The same coverage of 300 feet along the perimeter could be obtained with the SWL and a 300 feet range gate, or a clutter area of 6000 feet$^2$. The illuminated clutter area is, therefore, less by about a factor of 35 or 15.5 db of clutter power. This saving is also accompanied by a corresponding savings in bandwidth.

The prevailing clutter conditions are best described by reference to FIGS. 1 and 2. In the experimental set-up, only grass existed in the 20 feet corridor about the line, but no effort was made to control moving objects beyond that distance. Thus, vehicles with radio antennas, a chain link fence, or power lines were often located within a 100 feet distance. Operation of the same radar as a point sensor had heretofore found such targets troublesome. However, the SWL encountered none of these disturbances. The clutter level is evident from the graphs shown in FIGS. 3 and 4. It was measured at about 14 db above receiver noise. The SWL was tested during relative calm as well as during windy conditions with gusts up to 32 mph. The output remained within 2 db of the calm condition signals except when the range gate spanned the location of the feedhorn itself. However, this effect was anticipated since the experimental launcher was not of optimum design. The design of a more rigid launching device is not a significant problem.

The apparent insensitivity of the SWL to wind motion is striking. Besides the reduced clutter patch, the particular geometry of the SWL used produced an inherent advantage. Whereas, the upright antenna of an ordinary radar is moved by wind into (or away from) the clutter surrounding, or is turned about its support, causing fixed objects to produce moving target returns in a coherent system, the tautly suspended SWL will move primarily horizontally and parallel to its axis. That, however, causes the least clutter produced output. It neither tends to modulate the ground reflections by the field gradient, as would a vertical motion, nor does it produce actual Doppler by imparting to fixed targets apparent motion (in range), as would movement of the feedhorn in range. The effect of wind is thus inherently minimized.

Radio frequency interference was in evidence. This is usually intermittent and unpredictable in nature, since it is generally caused by communication users in the RF band of the receiver. Interference bursts were measured at 15–18 db above system noise or about 4 db above the background. This, however, should vary with location and time and is, therefore, difficult to forecast. The present equipment, although not optimized in frequency, does have considerable interference immunity. The pseudorandom phase modulation (see FIG. 2) was not employed during these experiments. It provides 30 db of reduction for in-band interfering signals. A second interference reduction technique monitors existing interference by means of an upper Doppler filter (1–5 KHz) which serves as a reference for interference and effectively raises the detection threshold for automatic operation.

The performance of the SWL during interference holds considerable interest. The ideal, non-radiating SWL, if considered as an antenna, would have zero gain everywhere except along its axis. However, a good termination at the end would prevent radiation into, hence interference from space. The practical SWL is expected to receive interference, wherever radiation to the outside exists, namely at discontinuities or due to the effect of the ground. Otherwise, its characteristics would be the same as those of the ideal SWL. A significant improvement in interference immunity is therefore expected, in comparison with the omni-directional antenna of the radar point sensor. This has only been verified qualitatively so far.

Several possible types of false alarm-producing targets exists. Primarily these include rain, snow, icicles and birds perching on the line or flying in close proximity to it. Due to their difficult-to-control nature many have not been observed specifically, but the following assessment can provide an indication of the performance of the system under such conditions.

False alarms occur when these targets perturb the relatively high field near the line and, despite their small reflectance, return sufficient energy to compete with valid target signals. Performance under these conditions then depends basically on one parameter; the amount of energy these undesirable targets are permitted to reflect. This implies that either a line must be designed having low field strength on its surface, or else targets must be confined beyond some minimum radius $r_{min}$ from the line where false alarms will no more be produced. These alternatives translate effectively into the same parameter; a large diameter structure, i.e., a "thick" line. If a line is constructed with outside radius $r_{min}$ and if the field distribution on the surface of this line is the same as exists at distance $r_{min}$ from the thin line, then its exterior field will be unchanged, hence target detection will be that of the thin line. In addition, the false alarm problem will be alleviated.

The thick line has a second advantage in that the radiation loss due to a discontinuity (icicle, bird) of a given size will be less than for the thin line. This is again due to the smaller perturbations taking place.

Figure 5A:
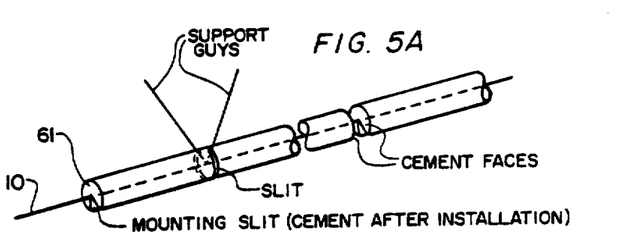
FIGS. 5(a), (b) and (c) are isometric views of two alternate embodiments of the surface wave transmission line used in FIG. 1.
Figure 5B:
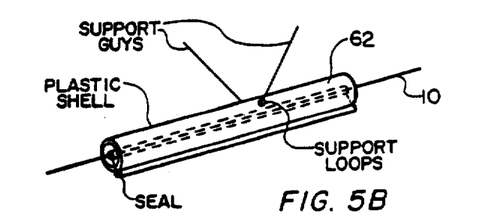
Figure 5C:
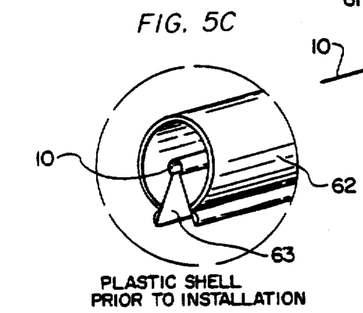

While the thick SWL used for these tests was simply a large diameter conductor, a thick line does not necessarily have to take this form. The configurations shown in FIG. 5 feature large radius shells which serve to keep perturbating effects from the SWL but are not part of the wave guiding structure. The shells comprise foam cylinders 61 fitted concentrically about the thin line 10. Alternatively, the shells may comprise hollow plastic enclosures 62 having a sealable opening 63 in which the line 10 is fitted.

To evaluate the effect of increasing the outer radius of the SWL from $r_o$ of the thin line to $r_{min}$, consider that the reflected voltage due to one scatterer, such as a rain drop, is proportional to $1/r^2$, since for small r, $H(r) \approx 1/r$ and a round trip of the energy takes place.

If the scatterer is now restrained to a distance $r_{min}$ of the thick line, the ratio of this reflected voltage $V_{min}$ to that for the thin line $V_o$ with radius $r_o$ will be $$\frac{V_{min}}{V_o} = \frac{r_o^2}{r_{min}^2};$$

furthermore $$\frac{P_{min}}{P_o} = \frac{r_o^4}{r_{min}^4}$$

will be the ratio of received clutter power for one rain drop. Since the number of such scatterers fallings on the surface is proportional to the radii, the ratio C of total received power is $$C = \frac{P_{min} r_{min}}{P_o r_o} = \frac{r_o^3}{r_{min}^3}.$$

For the lines used in these tests, having radii of 2 mm and 76 mm (3"), this ratio becomes 47.4 db.

This amount of clutter reduction can be expected if the field of the thin line is retained exactly. A further adjustment must be made if the diameter of the conductor itself is increased, since then the line impedance is reduced, i.e., the attenuation increased. Thus, the clutter power ratio C becomes $$C = \frac{r_o^3}{r_{min}^3} \cdot \frac{Z_o^2}{Z_1^2}$$

where $Z_o$ and $Z_1$ are the impedances of the thin and thick lines. Using standard surface wave line data, $Z_o/Z_1$ is estimated at about 2. C then becomes 41.4 db.

Figure 6A:
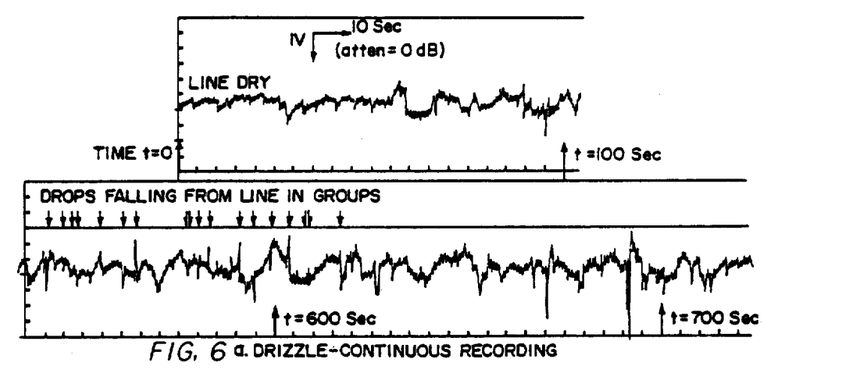
FIGS. 6(a) and (b) are graphs which respectively show the effect of drizzle and moderate rain on the system.

FIG. 6 shows the performance of the thin line in rain. The first recording (graph A) was made during drizzle, after the line was initially wiped clean. As drops accumulated and fell off in groups, spikes were observed in the output. This was sometimes even visually correlated. The increase in spike occurrence which was observed was directly related to the accumulation of rain drops on the previously dry wire.

Figure 6B:
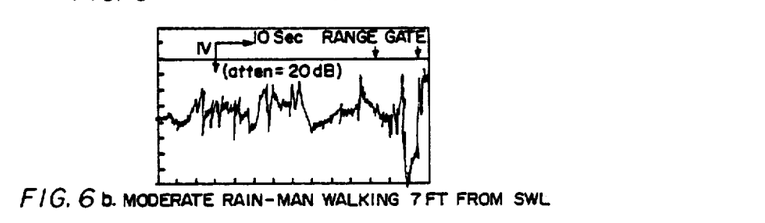

The second recording (graph B) is that of a walking man during moderate rain. It was made with 20 db additional attenuation in the receiver to prevent saturation from the rain return. However, this all but obliviated the walking-man signal. It is apparent that, for the thin line, the clutter level produced by ordinary rain is excessive for any operation. Clutter increase due to rain as high as 30 db was observed.

Figure 7A:
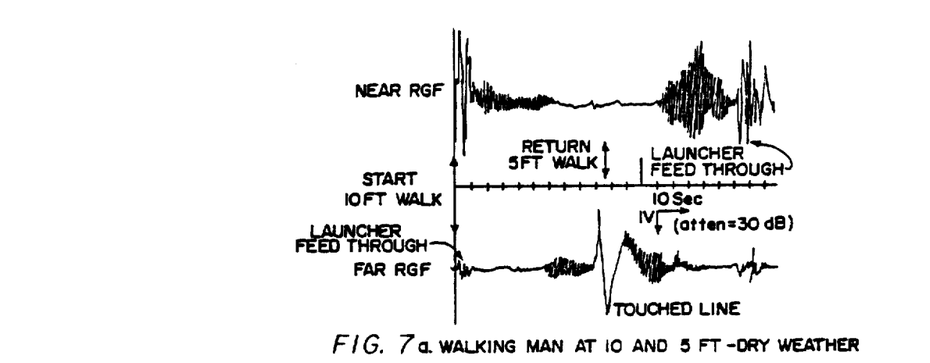
FIGS. 7(a) and (b) are graphs which respectively show the signal generated by a walking intruder in any weather and in rain.
Figure 7B:
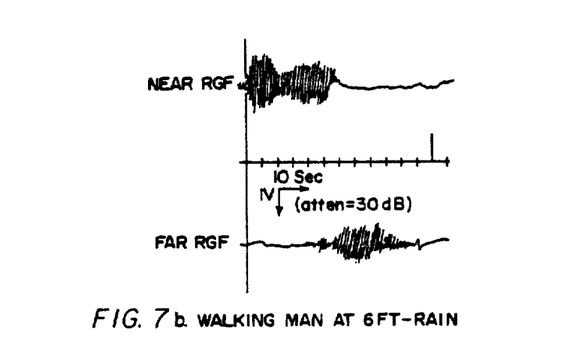

The thick line was operated in similar rain. FIG. 7 shows the walking-man response for that line during rain and dry weather. It is apparent that the effect of rain is completely eliminated. Signal-to-clutter ratio was about the same for both cases. Initial difficulties experienced with the thick line occurred during high wind which caused the metallic sections to move in their joints, causing large spikes. Also, the launching dipole had originally been inadequately secured, causing wind-produced noise. However, these are not inherent shortcomings and were quickly eliminated in subsequent tests.

Some other properties of the SWL relating to the boundary surveillance application were also investigated. One desirable characteristic for a line sensor is to have minimum loss per unit distance, since it may be required to cover several miles of perimeter. Attenuation for the ideal SWL may be very low, in the order of 3 db per km for the frequency range employed here. However, the practical case entails considerable deviations from the ideal. Losses are caused by supports, bends, surface perturbations and the proximity of the ground in which a portion of the transmitted energy propagates.

Measurements were made with the thin SWL. They indicate an attenuation of approximately 6 db for the 400 feet line at 200 MHz. The losses in each feedhorn were approximately 1.5 db. These figures refer to one-way loss and were obtained on dry ground. From known data, theoretical losses are 1.3 db for the line alone and 2.4 db, including the effect of the ground.

The relative field strength about the line was also measured. As mentioned before, the walking man response for various distances provides a good assessment which takes into account the entire system. The field strength indicated a change of about 11 db (2-way) over 2 feet of radial distance (7 feet and 9 feet points). One can calculate a theoretical decay of 9 db over the same interval. To avoid the variations of the human, this test was repeated with a target simulator. This consisted of a monopole antenna whose electrical size was changed periodically at a Doppler rate. It, thus, produced a repeatable signal similar to that of a fixed-size moving target.

Figure 8:
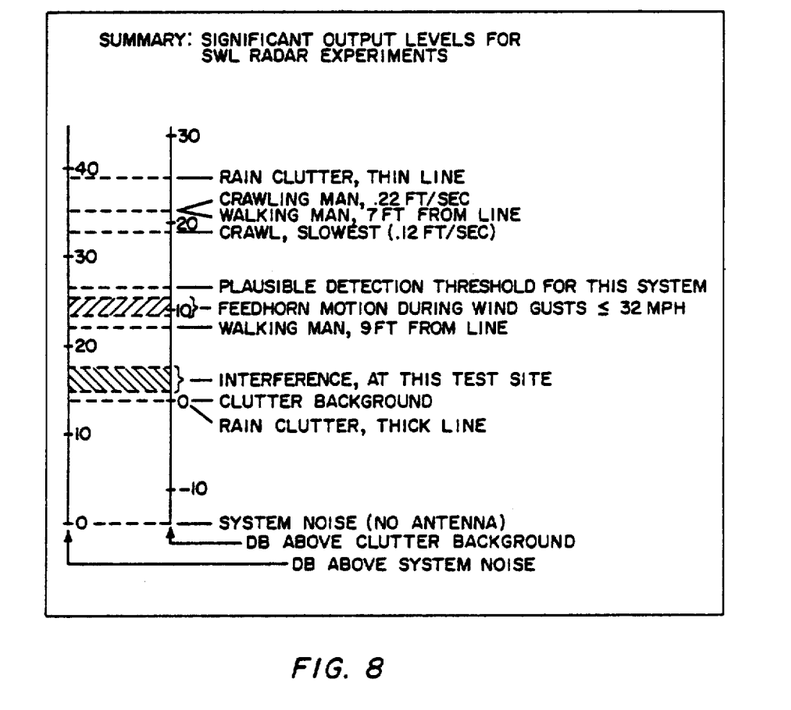
FIG. 8 is a graph which compares the strength of the received signal under a variety of conditions.

Next, the target simulator was placed on the ground at various distances from the SWL and the resulting Doppler output was recorded. This test showed that a target, such as a crawling man moving toward the line sensor, could increase by about 5 db in signal strength per foot traveled. The most significant levels determined for the SWL line sensor are summarized in the chart of FIG. 8. The margin which can be attained between desired signals and possible background should be noted. This indicates that automatic alarm operation is completely feasible.

From the results obtained, some parameters for a practical line sensor radar, applicable to a future system, can be stated. The primary requirement which evolved from the experiments conducted is the need to use a thick line in order to assure operation in rain and to avoid false alarms from rather commonplace effects. This characteristic can be achieved in many ways; however, it must observe reasonable cost per unit length and ease of installation and maintenance.

The two approaches, shown in FIG. 5, solve this problem. Both are based on a modification of the thin line which distinguishes itself by its light weight and installations with little sag and few supports. The first is the semi-rigid plastic enclosure 62 which serves also as a means of supporting the line. The second is simply the foam cylinder 61, slit longitudinally down to its center and fastened by periodic ties. Segments of 10 or 20 feet could easily be applied to a thin line and quickly cemented together without disturbing existing supports or causing excessive sag. These modifications can be designed so as to retain the thin line field but to enforce $r_{min}$ for rain and other perturbations.

From practical consideration, a height of approximately 5 feet appears a good choice. This will prevent a human from jumping over or running through the line, unhindered. Vehicles, including 2-wheeled ones, are not considered to present a detection problem since their increased reflective area would always produce sufficient returns, despite their greater speed capabilities. This choice of height would also prevent snow from covering the structure easily and still permit a relatively low frequency.

Control of foliage and similar clutter in the vicinity of the line is required. Clearly, tall growth of any kind cannot be tolerated. However, the clear corridor need only be relatively small, approximately 10 feet on either side of the center. For a practical line, a one-way attenuation of about ½ db per 100 feet is easily attained. Assuming a 26 db difference in signal strength between farthest and nearest targets, which is well within the dynamic range of today's receivers, this means that a ½ mile segment could be covered before repeaters are necessary. A uniform line, as assumed here, will normally produce a tapered illumination of the area of coverage due to the exponential transmission line decay of the axial field. If this taper were reversed, i.e., the line were constructed so as to "leak" an increasing amount with range, it would be possible to reveive equal returns from all ranges. Specifically, assuming a line with a uniform attenuation of 0.5 db/100 feet, leakage would have to increase 0.5 db/100 feet (to a first approximation, assuming that the radiated amount is small compared to the transmitted energy). This approach, however, is not considered practical, since then a physically non-uniform structure would result and/or point radiators would be employed with inherent disadvantage against a continuous line sensor.

Installed as a perimeter protection sensor, the SWL is confined to relatively straight runs. Sharp corners would require terminating and relaunching the wave with horns or similar devices. Irregular runs or very rough terrain could be protected by using a different medium such as the leaky coax in conjunction with the SWL.

Some useful applications of the SWL sensor include its operation in conjunction with a fence or in the space between a double fence. It appears that it should satisfy the requirements for these situations.

The frequency used for the experiments discussed above appears to be near optimum. It provides for near resonance for a target of human dimensions while reducing the effect of small animals or other unwanted targets. From the standpoints of surface perturbations of the line (icicles, rain, et cetera) and line loss, the frequency should be as low as possible. From the standpoints of launcher size and ground losses, it should be high. From the practical standpoint (frequency allocation) two plausible ranges exist: 220 MHz and 420 MHz appears optimum.

A resolution of 300 feet in range appears a good choice from the standpoint of user requirements, bandwidth, and number of range gates required per unit distance. Clutter, as experienced in the tests, would permit far larger gates. The Doppler filter's high frequency response could be reduced greatly from that employed in the test. An upper response of 10 feet/sec is judged sufficient and should provide added improvement of performance in rain.

Automatic detection appears necessary for practical reasons. A sufficient threshold-to-noise ratio has been demonstrated. Balanced processing was tested but did not offer any significant advantage since most output signals are not due to true Doppler and because the target does not remain unidirectional for a sufficiently long period.

A self-adaptive automatic alarm which senses the background and raises or lowers the detection threshold accordingly was also used. It is believed, however, that for perimeter protection the self-adaptive technique is less desirable since the system is effectively desensitized whenever clutter or other similar interference increases. This could result in a loss of perimeter protection, especially against the smallest target (crawling man). It could occur without indication to the human monitor, whereas the fixed threshold system will produce more false alarms as a warning signal that non-target activity has increased. The eventual choice of these alternatives will have to be determined by user perference.

No unusual requirements exist for the receiver except that Sensitivity Time Control (STC) would be required. As derived above, less than 40 db of STC would cover a practical range. Depending upon the length of the line, repeaters will be required at regular intervals. These may be simply line amplifiers or, since the radar itself appears to be relatively simple, these may be entire radar modules, receiving power from a central station and transmitting back alarm information over the wide bandwidth medium they are connected to.

Figure 9:
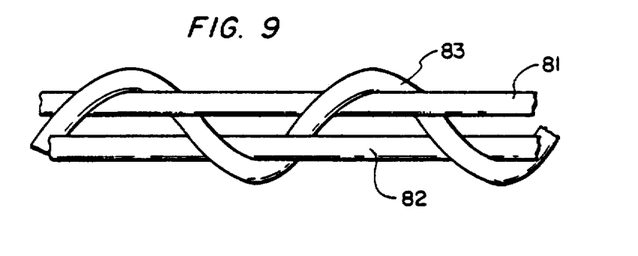
FIG. 9 is a side view of a first alternative line sensor according to the invention.
Figure 10:
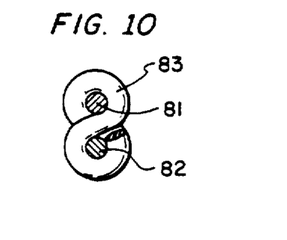
FIG. 10 is an end view of the line sensor shown in FIG. 9.

As previously mentioned, other forms of transmission lines may be used instead of the modified surface wave transmission line. For example, as shown in FIGS. 9 and 10, an ordinary wire pair, which may also be a twisted pair, laid on or slightly buried beneath the surface of the ground, may be used. As shown, the wire pair transmission line comprises a pair of conductors 81 and 82 advantageously separated by a non-conductive, e.g. plastic, cord 83. A video (DC) pulse applied at one end of the pair propagates along the wire and is partially reflected when an intruder's footstep disturbs the geometry or enters the field of the transmission medium. As before, range gating may be used to locate the intruder. Of course, this particular form of transmission line is suitable for use only in dry environments, for example, in the desert, inside buildings, under awnings, et cetera. The wire pair transmission line exhibits excellent sensitivity so that an intruder always produces a threshold signal whenever he steps upon the sensor. The signal-to-noise ratio is in excess of 12 db, even for minimum signals. During rainy conditions, however, the noise on this "open wire" transmission line tends to become unacceptable.

Figures 11, 12, 13:
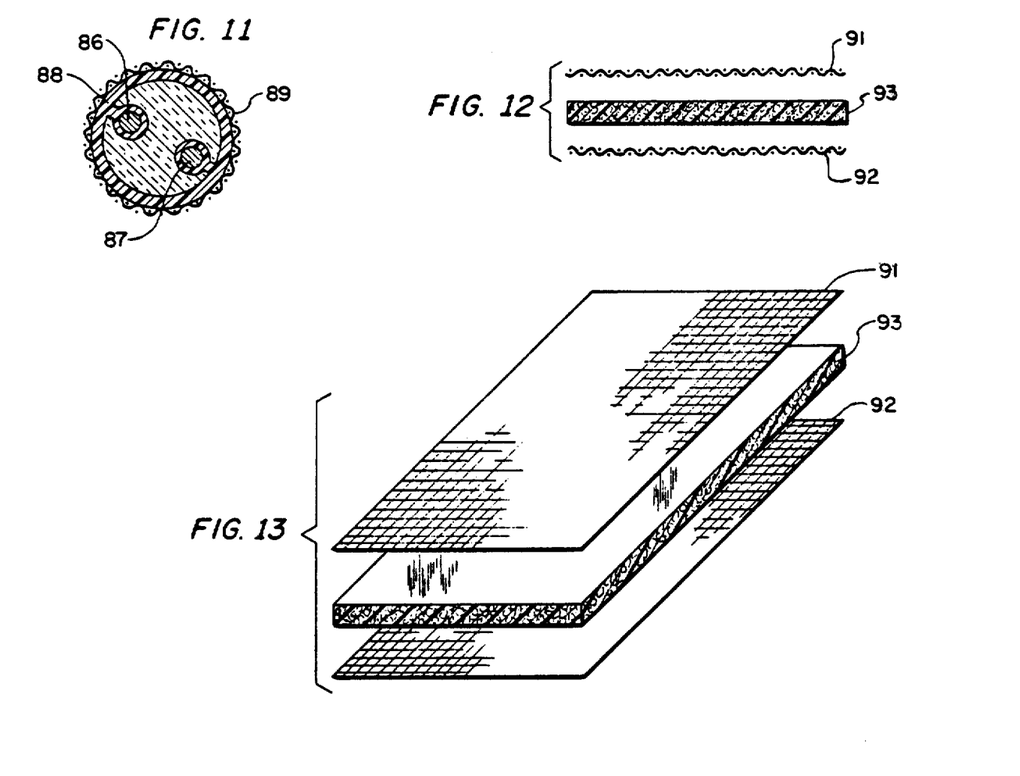
FIG. 11 is a cross-sectional view of another line sensor which offers protection against moisture.
FIG. 12 is a cross-sectional view of a transmission line in the form of a deformable mat.
FIG. 13 is an isometric view of the transmission line shown in FIG. 12.

FIG. 11 illustrates another type of transmission line suitable for use with the invention, i.e., a balanced transmission line similar to the low-loss 300 ohm line used for UHF TV. As shown, this type of transmission line comprises a pair of conductors 86, 87 held within a hollow plastic insulating shell 88. An optional metallic sheild 89 may be used to reduce interference and to lower attenuation. Since plastic shell 88 is flexible, the transmission line will deform under the weight of an intruder, as before. However, because this transmission line is physically enclosed, it represents an improvement over the "open wire" line previously discussed, especially during rain, as it prevents minor disturbances, such as raindrops, from entering the electric field of the line. Again, this may be a twisted pair.

Both of the above single-wire pair transmission lines suffer from the disadvantage that an intruder is likely to step over the transmission line rather than step on it, especially if he knows or suspects its location. To overcome this difficulty, FIGS. 12 and 13 depict the transmission line in the form of a wide waterproof mat. As shown, a pair of conductors 91 and 92, illustratively metallic screen wire, are separated by an easily compressible foam dielectric 93.

As previously described, a video pulse may be transmitted between conductors 91 and 92. This pulse will be partially reflected when an intruder deforms the transmission line by stepping on it.

Figures 14, 15:
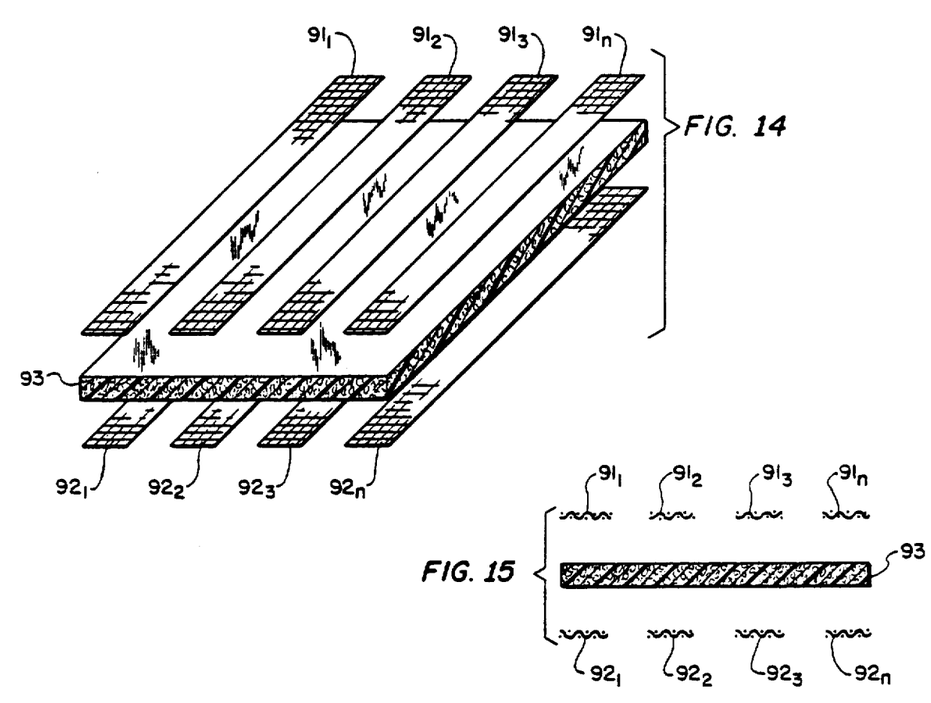
FIG. 14 is an isometric view of another embodiment of the mat shown in FIG. 13.
FIG. 15 is a cross-sectional view of the mat shown in FIG. 14.

As shown in FIG. 14, an alternate approach would be to construct the mat out of several separate conductor pairs $91_1, 91_2 \ldots 91_n$ and $92_1, 92_2 \ldots 92_n$ which are pulsed simultaneously. This, in effect, would comprise the parallel operation of several of the transmission lines shown in FIGS. 12 and 13, thus combining known excellent performance with simplicity of construction. The direction of travel of the target could also be determined by the sequence in which detections take place.

Figure 16:
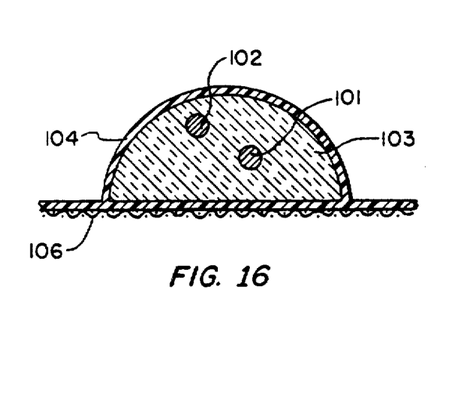
FIG. 16 is a cross-sectional view of a non-deformable transmission line for use above ground.
Figure 17:
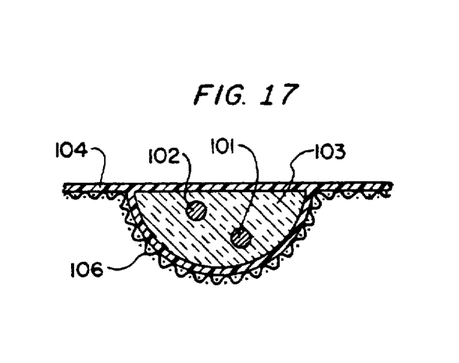
FIG. 17 is a cross-sectional view of a non-deformable transmission line for burial in a trench.

FIGS. 16 and 17 illustrate a non-deforming open wire line. As shown, transmission pairs 101 and 102 are enclosed in some suitable low-loss dielectric 103 within a plastic jacket 104. A metallic screen 106 may be employed to reduce losses. The spacing between pairs 101 and 102 is such that when the pair is pulsed with RF energy, a field extends above the surface to permit an intruder to disturb it. The embodiment of FIG. 17 is used if a groove can be dug in the ground, otherwise, the embodiment of FIG. 16 may be used.

Figure 18:
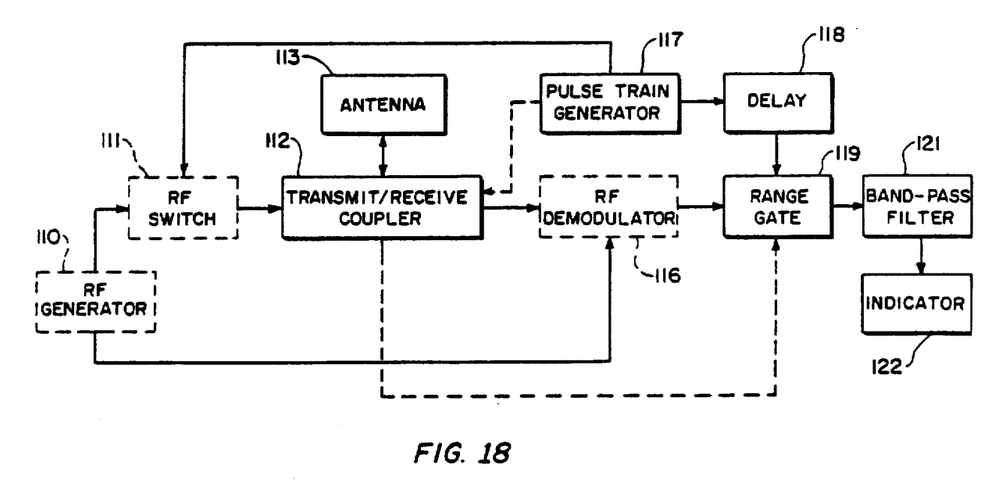
FIG. 18 is a block schematic drawing of an illustrative range-gating detector for use with the antennaes shown in FIGS. 9-17.

FIG. 18 depicts an illustrative RF energizing and range-gating circuit suitable for use with any of the antennas shown in FIGS. 9–17.

As shown, the output of an RF generator 110 is connected via an RF switch 111 and a transmit/receive coupler 112 to the antenna 113. The energy reflected by an intruder back off the antenna is fed, via coupler 112, to an RF demodulator 116, which also receives the RF output from RF generator 110. The output of a pulse-train generator 117 is fed, via a delay line 118, to a range gate circuit 119. The output of pulse train generator 117 is also connected to RF switch 111 to control the operation of the same. The output of range gate circuit 119 is connected to a bandpass filter 121, thence to an indicator 122. The output of RF generator 110 is either a CW RF signal in the 1 to 100 MHz range or a train of video pulses.

Figures 19, 20:
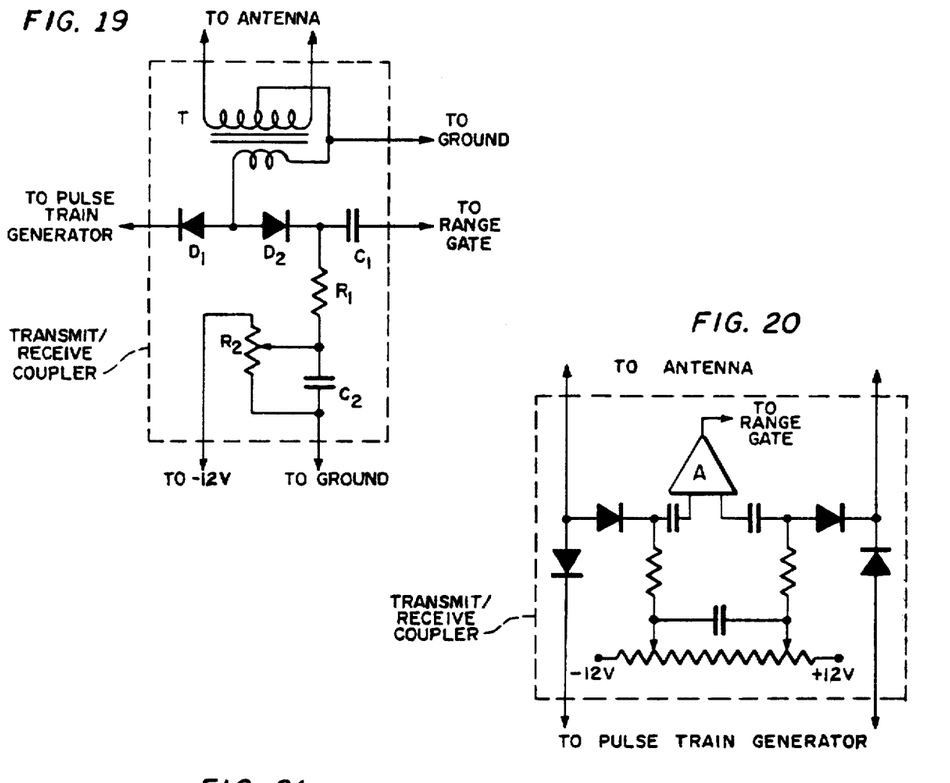
FIGS. 19 and 20 are circuit arrangements for use as RF switches/couplers in the detector circuit shown in FIG. 18.

If a pulsed RF signal is used, the transmit/receiver coupler 112 may comprise a hybrid or a circulator. If a video pulse is used, the dashed components in FIG. 18, that is the RF generator 110, the demodulator 116 and RF switch 111 are omitted and a connection made directly from generator 117 to coupler 112 and from coupler 112 to range gate 119. In this case, the transmit/receiver coupler of FIG. 19 is used. As shown, the pulses from pulse train generator 117 are generated at $-12$ volts with respect to ground and pass through diode D1 and transformer T to the antenna. Diode D2 is non-conducting at this time.

The return signal from the antenna passes through diode D2 to the range gate 119. Diode D1 is back-biased when the output from the pulse train generator is zero. Potentiometer R2 provides, through R1, the necessary bias voltage to open diode D2 for small signal levels. For full range coverage, multiple delay lines, range gates, bandpass filters and indicators may be used.

Transformer T, used to match the unsymmetrical output of the pulse train generator to the symmetrical antenna input can be eliminated, as shown in FIG. 20, by the use of a differential amplifier A.

Figure 21:
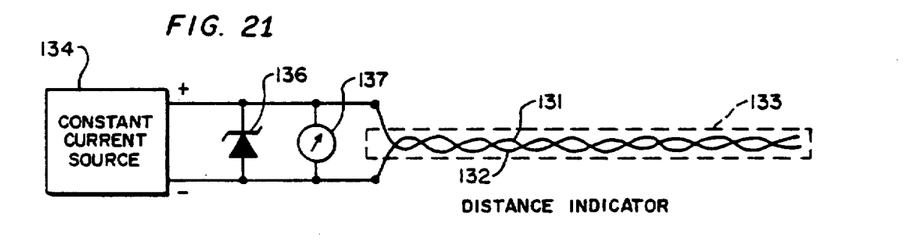
FIG. 21 is a partially schematic drawing of a line sensor employing a short-circuited open cable pair.

FIG. 21 depicts yet another embodiment of the invention using a specially constructed cable. The cable contains two bare conductors 131 and 132 arranged in a double helix and retained in this position by an easily deformed outer jacket 133. This cable is placed on the ground so that an intruder's footsetp deforms it, causing a momentary short between the conductors. The location of this short, hence the position of the intruder, is then found either through time domain reflectometry or through a simple resistance measurement. Again, where trip wire operation is not sufficient, and where multiple passes cannot be laid in a practical way, this type of cable could be produced in the form of a mat for shallow burial. One way to measure the resistance of the cable, (up to the short) is to connect a constant current source 134 and a distance indicator (volt-meter) to the cable, as shown. A zener diode 136 is connected across the constant current source to prevent the voltage across the cable rising to too high a level.

Figure 22:
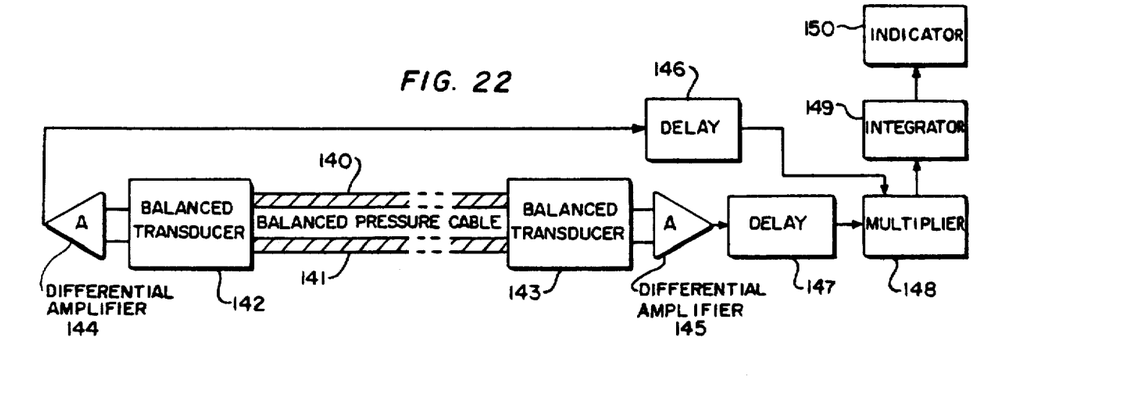
FIG. 22 is a partially schematic, partially block diagramatic drawing of an alternative embodiment of the invention which uses a passive pressure sensor.

FIG. 22 depicts an arrangement which provides range measurement for the known Balanced Pressure System (BPS) sensor. The BPS consists of two fluid filled hoses 140 and 141 buried within a few feet of each other. Seismic disturbances caused by an intruder are transformed into pressure pulses and detected. In order to eliminate false alarms from extraneous disturbances, the BPS forms the difference between the two lines. A remote disturbance results in a cancellation while a valid target, stepping near the lines, will normally not produce equal pressure pulses, thus being detected.

Range information can be gained when longer distances must be covered if balanced transducers 142, 143 are connected to both ends of the two hoses. Two differential amplifiers 144, 145 would then "see" two pulse pairs. The time difference of these signals from the differential amplifiers is then directly related to the intruder's location. The signals are fed to delay lines 146, 147 and to multiplier 148. The output of multiplier 148 is fed to integrator 149 and then to indicator 150. The effect of the multiplier and integrator is to perform a correlation between the two signals out of the delay line. If the pulses out of the delay line arrive at a time difference more than one pulse width apart, the pulses are not correlated and therefore give no output. But if the delay lines are so adjusted that the pulses arrive together, then the multiplier and integrator provide a maximum output to the indicator. In this case, the adjustment of the delays indicates the intruder's location.

Figure 23:
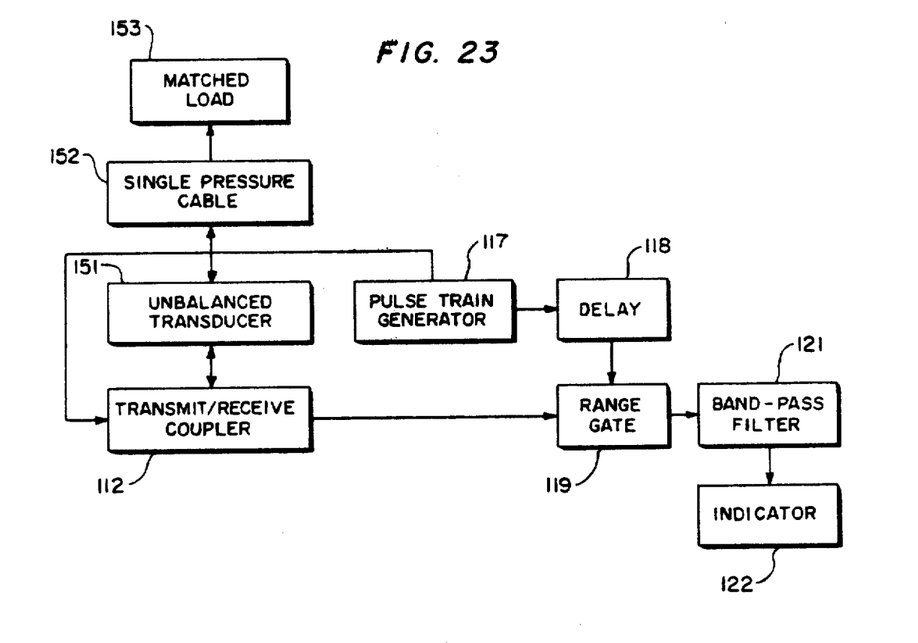
FIG. 23 shows another embodiment employing an active pressure sensor.

An active system can also be made from a simplified version of FIG. 18, with the antenna replaced by an unbalanced transducer 151 feeding a single pressure cable 152 terminated with a matched load 153 at the far end, as shown in FIG. 23.

In simplified form, this system consists of buried tubes filled with some fluid. Pressure pulses are transmitted into one end and propagate through the medium at acoustic velocity. Echoes will be reflected towards the source from the surround. These are detected and processed for moving targets as in an ordinary sonar system, providing moving target discrimination and ranging. To reject large but distant false targets, a differential system as in the BPS can again be used.

One possible modification is pseudo-random coding of the train of video pulses for the embodiment of FIG. 18 in which the boxes in dotted outline are omitted, and the dotted connections are used. The coding may comprise pseudo-random reversal of polarity in the train of pulses, pseudo-random omission of a pulse from time to time, or a combination of both. The repetition rate of the pulses may be the same, whether or not an RF generator is used, and whether or not coding is used. A rate which has been used successfully is 23 KHz. The same pseudo-random coding may be used in the embodiment with an RF generator and demodulator.

One skilled in the art can make various changes and modifications without departing from the spirit and scope of the invention as set forth in the appended claims.

What is claimed is:

1. An electronic intrusion detection system which comprises:
   a loosely twisted cable comprising two bare conductor wires arranged in a double helix retained in that position by an easily deformed outer insulating jacket, which cable is disposed across a surveilled area where an intruder may step upon the cable and cause an at least momentary contact of the bare wires at that place of the cable;
   a constant current source connected in parallel to the terminals of the two cable wires at one end of said cable;
   a zener diode connected in parallel to the terminals of the said constant current source for limiting the amount of voltage present along the cable circuit; and
   a meter means connected in parallel across the terminals of said current source zener diode, and said one end of said cable, having a scale for indicating the distance of intrusion along the said cable.

* * * * *